US009740985B2

(12) United States Patent
Byron et al.

(10) Patent No.: US 9,740,985 B2
(45) Date of Patent: Aug. 22, 2017

(54) RATING DIFFICULTY OF QUESTIONS

(71) Applicant: International Business Machines Corporation, Armonk, NY (US)

(72) Inventors: Donna K. Byron, Petersham, MA (US); Suzanne L. Estrada, Boca Raton, FL (US); Alexander Pikovsky, Lexington, MA (US); Timothy P. Winkler, Clinton, MA (US)

(73) Assignee: International Business Machines Corporation, Armonk, NY (US)

( * ) Notice: Subject to any disclaimer, the term of this patent is extended or adjusted under 35 U.S.C. 154(b) by 494 days.

(21) Appl. No.: 14/295,514

(22) Filed: Jun. 4, 2014

(65) Prior Publication Data
US 2015/0356420 A1 Dec. 10, 2015

(51) Int. Cl.
| | | |
|---|---|---|
| *G06N 5/00* | (2006.01) | |
| *G06F 1/00* | (2006.01) | |
| *G06N 7/00* | (2006.01) | |
| *G06N 5/04* | (2006.01) | |
| *G06N 99/00* | (2010.01) | |

(52) U.S. Cl.
CPC .............. *G06N 7/00* (2013.01); *G06N 5/04* (2013.01); *G06N 99/005* (2013.01)

(58) Field of Classification Search
CPC ............. G06N 5/04; G06N 7/005; G06N 5/02
See application file for complete search history.

(56) References Cited

U.S. PATENT DOCUMENTS

| | | | |
|---|---|---|---|
| 7,603,330 B2 | 10/2009 | Gupta et al. | |
| 7,766,743 B2 | 8/2010 | Jebb et al. | |
| 8,301,438 B2 | 10/2012 | Ferrucci et al. | |
| 2005/0272021 A1 | 12/2005 | Yu | |
| 2009/0287678 A1 | 11/2009 | Brown et al. | |
| 2009/0307159 A1* | 12/2009 | Pinckney ............. G06N 99/005 706/11 |
| 2010/0070554 A1 | 3/2010 | Richardson et al. | |
| 2010/0076978 A1 | 3/2010 | Cong et al. | |
| 2010/0198837 A1* | 8/2010 | Wu ................... G06F 17/30672 707/748 |
| 2011/0066587 A1 | 3/2011 | Ferrucci et al. | |
| 2011/0125734 A1 | 5/2011 | Duboue et al. | |

(Continued)

OTHER PUBLICATIONS

List of IBM Patents or Patent Applications Treated as Related (Appendix P) dated Mar. 4, 2016, 2 pages.

(Continued)

*Primary Examiner* — Stanley K Hill
*Assistant Examiner* — Kalpana Bharadwaj
(74) *Attorney, Agent, or Firm* — Stephen R. Tkacs; Stephen J. Walder, Jr.; William J. Stock

(57) ABSTRACT

A mechanism is provided in a data processing system for rating difficulty of a question. The mechanism receives an input question and generates one or more candidate answers from a corpus of knowledge using a pipeline of software engines. The pipeline of software engines generates a plurality of features extracted from the question, the one or more candidate answers, or the corpus of knowledge. The mechanism then generates a question difficulty score based on the plurality of features using a machine learning model. The machine learning model maps features to assigned weights for scaling the difficulty score.

16 Claims, 5 Drawing Sheets

(56) References Cited

U.S. PATENT DOCUMENTS

| | | |
|---|---|---|
| 2011/0275049 A1 | 11/2011 | Albright |
| 2013/0007033 A1 | 1/2013 | Brown et al. |
| 2013/0007055 A1 | 1/2013 | Brown et al. |
| 2013/0018652 A1 | 1/2013 | Ferrucci et al. |
| 2013/0066886 A1 | 3/2013 | Bagchi et al. |
| 2013/0086171 A1 | 4/2013 | Sayankar et al. |
| 2013/0224718 A1 | 8/2013 | Woodward et al. |
| 2014/0030686 A1 | 1/2014 | Stambaugh et al. |
| 2015/0286632 A1* | 10/2015 | Meunier ............ G06F 17/2854 704/2 |

OTHER PUBLICATIONS

Bunescu, Razvan et al., "A Utility-Driven Approach to Question Ranking in Social QA", Proceedings of the 23rd International Conference on Computational Linguistics (COLING 2010), Beijing, Aug. 2010, pp. 125-133.

Dixit, Chinmayi et al., "Difficulty Index of a Question Paper: A New Perspective", 2012 IEEE International Conference on Engineering Education: Innovative Practices and Future Trends (AICERA), Jul. 19-21, 2012, 5 pages.

Gunel, Korhan et al., "Determining Difficulty of Questions in Intelligent Tutoring Systems", The Turkish Online Journal of Educational Technology—TOJET Jul. 2009, vol. 8 Issue 3 Article 2, 8 pages.

High, Rob, "The Era of Cognitive Systems: An Inside Look at IBM Watson and How it Works", IBM Corporation, Redbooks, Dec. 12, 2012, 16 pages.

Perez, Elena V. et al., "Automatic Classification of Question Difficulty Level: Teachers' Estimation vs. Students' Perception", 2012 Frontiers in Education Conference Proceedings, Seattle, WA, Oct. 3-6, 2012, 5 pages.

Puttan, Chokchai et al., "Expertise Ranking in Question-Answer Social Network Groups", The 10th International Joint Conference on Computer and Software Engineering (JCSSE'13), May 29-31, 2013, 6 pages.

Yuan, Michael J. , "Watson and healthcare, How natural language processing and semantic search could revolutionize clinical decision support", IBM developerWorks, IBM Corporation, Apr. 12, 2011, 14 pages.

\* cited by examiner

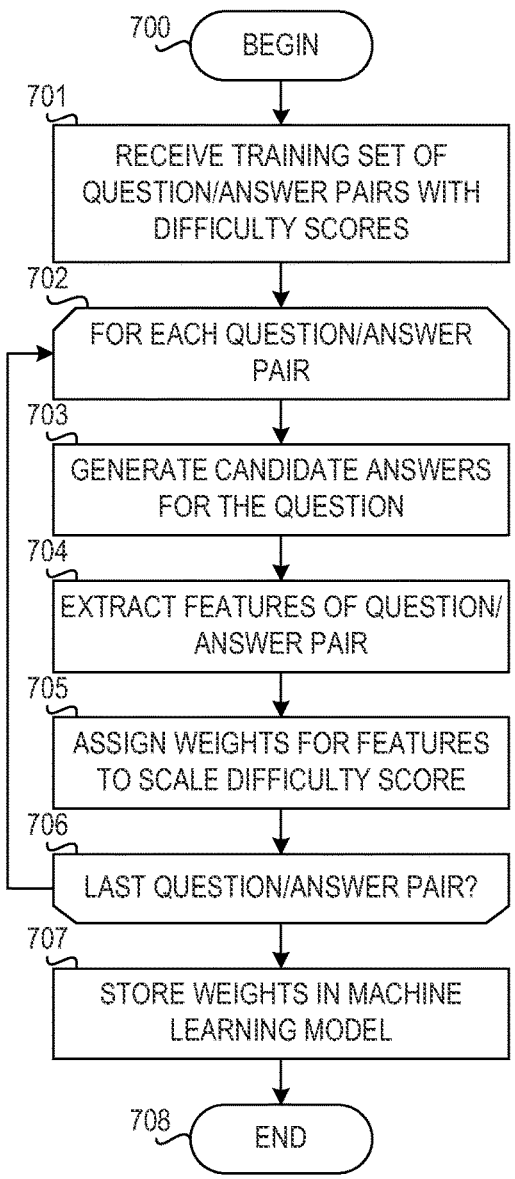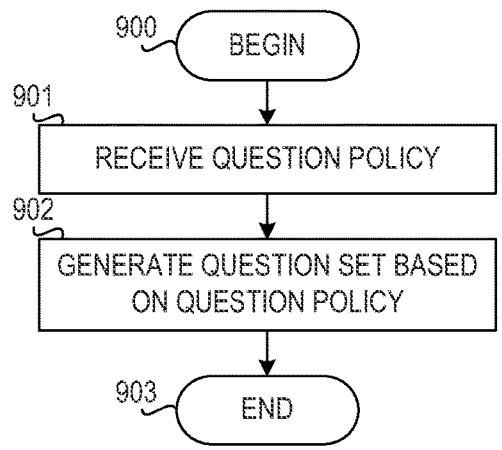

United States Patent US 9,740,985 B2

RATING DIFFICULTY OF QUESTIONS

BACKGROUND

The present application relates generally to an improved data processing apparatus and method and more specifically to mechanisms for rating difficulty of questions.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems, which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

One such QA system is the Watson™ system available from International Business Machines (IBM) Corporation of Armonk, N.Y. The Watson™ system is an application of advanced natural language processing, information retrieval, knowledge representation and reasoning, and machine learning technologies to the field of question answering. The Watson™ system is built on IBM's DeepQA™ technology used for hypothesis generation, massive evidence gathering, analysis, and scoring. DeepQA™ takes an input question, analyzes it, decomposes the question into constituent parts, generates one or more hypotheses based on the decomposed question and results of a primary search of answer sources, performs hypothesis and evidence scoring based on a retrieval of evidence from evidence sources, performs synthesis of the one or more hypotheses, and based on trained models, performs a final merging and ranking to output an answer to the input question along with a confidence measure.

Various United States patent application Publications describe various types of question and answer systems. U.S. Patent Application Publication No. 2011/0125734 discloses a mechanism for generating question and answer pairs based on a corpus of data. The system starts with a set of questions and then analyzes the set of content to extract answer to those questions. U.S. Patent Application Publication No. 2011/0066587 discloses a mechanism for converting a report of analyzed information into a collection of questions and determining whether answers for the collection of questions are answered or refuted from the information set. The results data are incorporated into an updated information model.

SUMMARY

In one illustrative embodiment, a method, in a data processing system, is provided for rating difficulty of a question. The method comprises receiving an input question and generating one or more candidate answers from a corpus of knowledge using a pipeline of software engines. The pipeline of software engines generates a plurality of features extracted from the question, the one or more candidate answers, or the corpus of knowledge. The method further comprises generating a question difficulty score based on the plurality of features using a machine learning model. The machine learning model maps features to assigned weights for scaling the difficulty score.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 is a flowchart illustrating operation of training a system for rating difficulty in accordance with an illustrative embodiment;

FIG. 9 is a flowchart illustrating operation of a system for selecting a question set in accordance with an illustrative embodiment.

DETAILED DESCRIPTION

Figure 1:
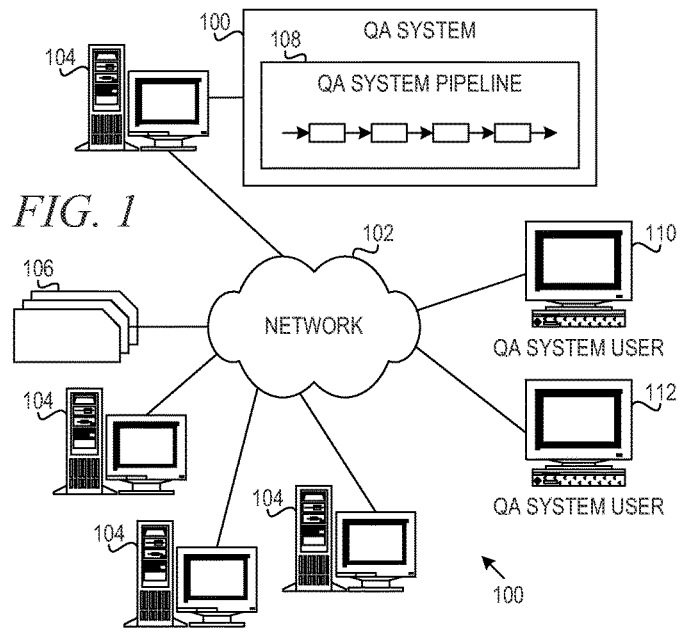
FIG. 1 depicts a schematic diagram of one illustrative embodiment of a question/answer creation (QA) system in a computer network.

The illustrative embodiments provide a mechanism for rating difficulty of questions. In many cases, it is desirable to have an estimate of question difficulty. For example, one may use a large set of quiz questions to test students' knowledge. It is desirable to expose each student to questions of comparable difficulty from a comparable domain. A question generation system may generate factual questions that require knowledge of multiple facts from a corpus of knowledge, synthesis of material, making an inferential leap, or applying a concept in a novel way. Some facts may be less known than other facts. As a result, the question using the less known fact will generally be harder to answer. Such a question generation system may use the target measure of question complexity to calibrate which questions are actually generated.

An illustrative embodiment provides a mechanism to rate difficulty of a factual question given a corpus of knowledge. The corpus is in a structured format, an unstructured format, or a combination of structured and unstructured. One may use the difficulty rating to estimate the difficulty of a question posed regarding the corpus of knowledge within a computer-based instruction scenario. One may use the difficulty rating to generate questions with a desired target difficulty level. For example, one may generate quiz sets and to train a natural language processing (NLP) system, such as a question answering (QA) system.

In one embodiment, the system evaluates a set of questions and assigns a difficulty score. The system then uses the set of questions to generate subsequent question sets, quizzes, and the like. In another embodiment, the question generating system has some question difficulty-related policies. Such a system may, for example, discard a question candidate if it does not meet the expected difficulty. The system may be configured to compose quizzes with a specified mixture of difficulty levels of the questions, resulting in a set of unique quizzes having equivalent overall difficulty level.

An advantage of assigning difficulty levels through automated methods, as opposed to manual assignment, is that the difficulty score may vary per domain, or within one domain, when the corpus of information used as a source of support changes. Therefore, the same question may have a different difficulty in a Social Sciences domain than in an Arts domain, or when created for medical students versus undergraduates.

A "mechanism," as used herein, may be an implementation of the functions or aspects of the illustrative embodiments in the form of an apparatus, a procedure, or a computer program product. The mechanisms described herein may be implemented as specialized hardware, software executing on general purpose hardware, software instructions stored on a medium such that the instructions are readily executable by specialized or general purpose hardware, a procedure or method for executing the functions, or a combination of the above.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would be readily apparent to those of ordinary skill in the art in view of the present description of the illustrative embodiments.

Figure 2:
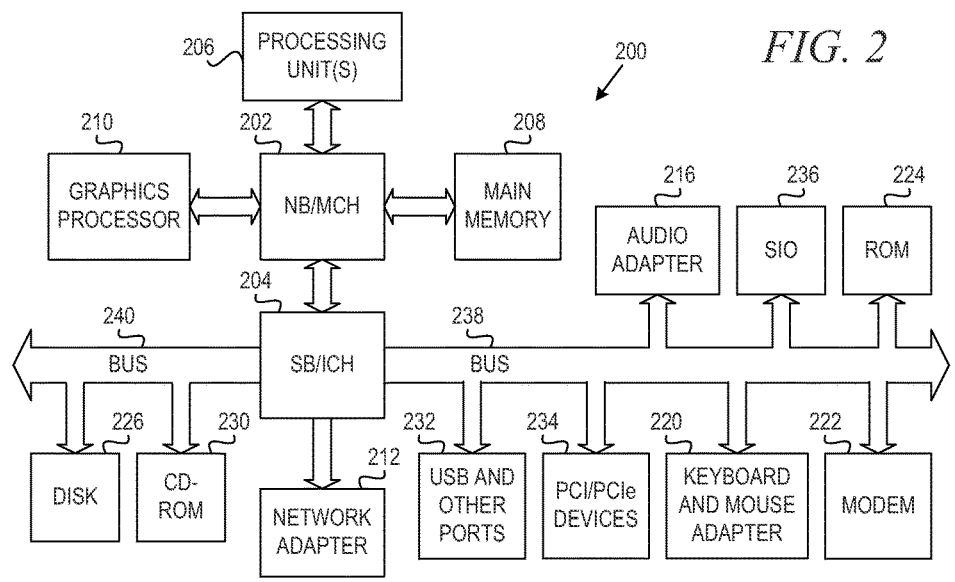
FIG. 2 is a block diagram of an example data processing system in which aspects of the illustrative embodiments may be implemented.
Figure 3:
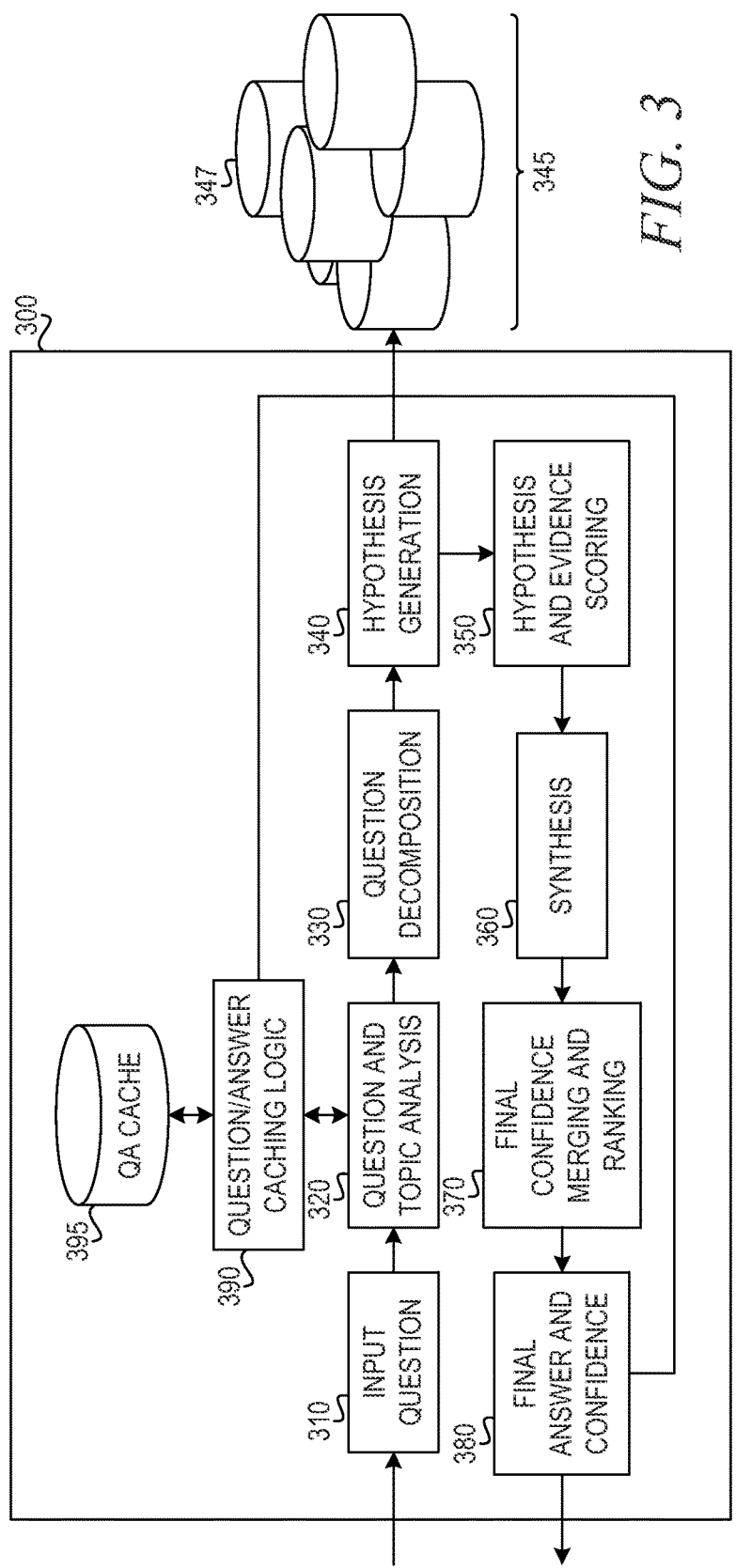
FIG. 3 illustrates a QA system pipeline for processing an input question in accordance with one illustrative embodiment.

FIGS. 1-3 are directed to describing an example Question/Answer, Question and Answer, or Question Answering (QA) system, methodology, and computer program product with which the mechanisms of the illustrative embodiments may be implemented. As will be discussed in greater detail hereafter, the illustrative embodiments may be integrated in, and may augment and extend the functionality of, these QA mechanisms with regard to automatically generating testing/training questions and answers by performing pattern based analysis and natural language processing techniques on the given corpus for quick domain adaptation.

Thus, it is important to first have an understanding of how question and answer creation in a QA system may be implemented before describing how the mechanisms of the illustrative embodiments are integrated in and augment such QA systems. It should be appreciated that the QA mechanisms described in FIGS. 1-3 are only examples and are not intended to state or imply any limitation with regard to the type of QA mechanisms with which the illustrative embodiments may be implemented. Many modifications to the example QA system shown in FIGS. 1-3 may be implemented in various embodiments of the present invention without departing from the spirit and scope of the present invention.

QA mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e., candidate answers.

Content creators, such as article authors, electronic document creators, web page authors, document database creators, and the like, determine use cases for products, solutions, and services described in such content before writing their content. Consequently, the content creators may know what questions the content is intended to answer in a particular topic addressed by the content. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA system. Content creators, automated tools, or the like, annotate or otherwise generate metadata for providing information useable by the QA system to identify these question-and-answer attributes of the content.

Operating on such content, the QA system generates answers for input questions using a plurality of intensive analysis mechanisms, which evaluate the content to identify the most probable answers, i.e., candidate answers, for the input question. The illustrative embodiments leverage the work already done by the QA system to automatically generate testing/training questions and answers by performing pattern based analysis and natural language processing techniques on the given corpus for quick domain adaptation.

FIG. 1 depicts a schematic diagram of one illustrative embodiment of a question/answer creation (QA) system 100 in a computer network 102. One example of a question/answer generation which may be used in conjunction with the principles described herein is described in U.S. Patent Application Publication No. 2011/0125734, which is herein incorporated by reference in its entirety. The QA system 100 may be implemented on one or more computing devices 104 (comprising one or more processors and one or more memories, and potentially any other computing device elements generally known in the art including buses, storage devices, communication interfaces, and the like) connected to the computer network 102. The network 102 includes multiple computing devices 104 in communication with each other and with other devices or components via one or more wired and/or wireless data communication links, where each communication link comprises one or more of wires, routers, switches, transmitters, receivers, or the like. The QA system 100 and network 102 enable question/answer (QA) generation functionality for one or more QA system users via their respective computing devices 110, 112. Other embodiments of the QA system 100 may be used with components, systems, subsystems, and/or devices other than those that are depicted herein.

The QA system 100 may be configured to implement a QA system pipeline 108 that receive inputs from various sources. For example, the QA system 100 may receive input from the network 102, a corpus of electronic documents 106, QA system users, or other data and other possible sources of input. In one embodiment, some or all of the inputs to the QA system 100 is routed through the network 102. The various computing devices 104 on the network 102 include access points for content creators and QA system users. Some of the computing devices 104 include devices for a database storing the corpus of data 106 (which is shown as a separate entity in FIG. 1 for illustrative purposes only). Portions of the corpus of data 106 may also be provided on one or more other network attached storage devices, in one or more databases, or other computing devices not explicitly shown in FIG. 1. The network 102 includes local network connections and remote connections in various embodiments, such that the QA system 100 may operate in environments of any size, including local and global, e.g., the Internet.

In one embodiment, the content creator creates content in a document of the corpus of data 106 for use as part of a corpus of data with the QA system 100. The document includes any file, text, article, or source of data for use in the QA system 100. QA system users access the QA system 100 via a network connection or an Internet connection to the network 102, and input questions to the QA system 100 to be answered by the content in the corpus of data 106. In one embodiment, the questions are formed using natural language. The QA system 100 interprets the question and provide a response to the QA system user, e.g., QA system user 110, containing one or more answers to the question. In some embodiments, the QA system 100 provides a response to users in a ranked list of candidate answers.

The QA system 100 implements a QA system pipeline 108, which comprises a plurality of stages for processing an input question, the corpus of data 106, and generating answers for the input question based on the processing of the corpus of data 106. The QA system pipeline 108 will be described in greater detail hereafter with regard to FIG. 3.

In some illustrative embodiments, the QA system 100 may be the Watson™ QA system available from International Business Machines Corporation of Armonk, N.Y., which is augmented with the mechanisms of the illustrative embodiments described hereafter. The Watson™ QA system receives an input question, which it then parses to extract the major features of the question, which in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The Watson™ QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms look at the matching of terms and synonyms within the language of the input question and the found portions of the corpus of data. Other reasoning algorithms look at temporal or spatial features in the language, while others evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the Watson™ QA system. The statistical model is then used to summarize a level of confidence that the Watson™ QA system has regarding the evidence that the potential response, i.e., candidate answer, is inferred by the question. This process is repeated for each of the candidate answers until the Watson™ QA system identifies candidate answers that surface as being significantly stronger than others and thus, generates a final answer, or ranked set of answers, for the input question. More information about the Watson™ QA system may be obtained, for example, from the IBM Corporation website, IBM Redbooks, and the like. For example, information about the Watson™ QA system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

FIG. 2 is a block diagram of an example data processing system in which aspects of the illustrative embodiments may be implemented. Data processing system 200 is an example of a computer, such as server 104 or client 110 in FIG. 1, in which computer usable code or instructions implementing the processes for illustrative embodiments of the present invention may be located. In one illustrative embodiment, FIG. 2 represents a server computing device, such as a server 104, which, which implements a QA system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates a QA system pipeline for processing an input question in accordance with one illustrative embodiment. The QA system pipeline of FIG. 3 may be implemented, for example, as QA system pipeline 108 of QA system 100 in FIG. 1. It should be appreciated that the stages of the QA system pipeline shown in FIG. 3 may be implemented as one or more software engines, components, or the like, which are configured with logic for implementing the functionality attributed to the particular stage. Each stage may be implemented using one or more of such software engines, components or the like. The software engines, components, etc. may be executed on one or more processors of one or more data processing systems or devices and may utilize or operate on data stored in one or more data storage devices, memories, or the like, on one or more of the data processing systems. The QA system pipeline of FIG. 3 may be augmented, for example, in one or more of the stages to implement the improved mechanism of the illustrative embodiments described hereafter, additional stages may be provided to implement the improved mechanism, or separate logic from the pipeline 300 may be provided for interfacing with the pipeline 300 and implementing the improved functionality and operations of the illustrative embodiments.

As shown in FIG. 3, the QA system pipeline 300 comprises a plurality of stages 310-380 through which the QA system operates to analyze an input question and generate a final response. In an initial question input stage 310, the QA system receives an input question that is presented in a natural language format. That is, a user may input, via a user interface, an input question for which the user wishes to obtain an answer, e.g., "Who are Washington's closest advisors?" In response to receiving the input question, the next stage of the QA system pipeline 300, i.e. the question and topic analysis stage 320, parses the input question using natural language processing (NLP) techniques to extract major features from the input question, classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

The identified major features are then used during the question decomposition stage 330 to decompose the question into one or more queries to be applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345.

There may be different corpora 347 defined for different collections of documents based on various criteria depending upon the particular implementation. For example, different corpora may be established for different topics, subject matter categories, sources of information, or the like. As one example, a first corpus is associated with healthcare documents while a second corpus is associated with financial documents. Alternatively, one corpus comprises documents published by the U.S. Department of Energy while another corpus comprises IBM Redbooks documents. Any collection of content having some similar attribute is considered to be a corpus 347 within the corpora 345.

As used herein, a "domain" is a technical, professional, or academic field having a corresponding corpus or source of information. For instance, one domain is a healthcare domain where a corresponding corpus for the domain includes healthcare documents and another domain is a financial domain where a corresponding corpus for the financial domain is a collection of financial documents.

The queries are applied to one or more databases storing information about the electronic texts, documents, articles, websites, and the like, that make up the corpus of data/information, e.g., the corpus of data 106 in FIG. 1. The queries being applied to the corpus of data/information at the hypothesis generation stage 340 to generate results identifying potential hypotheses for answering the input question which can be evaluated. That is, the application of the queries results in the extraction of portions of the corpus of data/information matching the criteria of the particular query. These portions of the corpus are then be analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that need to be evaluated.

The QA system pipeline 300, in stage 350, then performs a deep analysis and comparison of the language of the input question and the language of each hypothesis or "candidate answer" as well as performs evidence scoring to evaluate the likelihood that the particular hypothesis is a correct answer for the input question. As mentioned above, this may involve using a plurality of reasoning algorithms, each performing a separate type of analysis of the language of the input question and/or content of the corpus that provides evidence in support of, or not, of the hypothesis. Each reasoning algorithm generates a score based on the analysis it performs, which indicates a measure of relevance of the individual portions of the corpus of data/information extracted by application of the queries as well as a measure of the correctness of the corresponding hypothesis, i.e., a measure of confidence in the hypothesis.

In the synthesis stage 360, the many relevance scores generated by the various reasoning algorithms are synthesized into confidence scores for the various hypotheses. This process involves applying weights to the various scores, where the weights have been determined through training of the statistical model employed by the QA system and/or dynamically updated, as described hereafter. The weighted scores are processed in accordance with a statistical model generated through training of the QA system that identifies a manner by which these scores are combined to generate a confidence score or measure for the individual hypotheses or candidate answers. This confidence score or measure summarizes the level of confidence that the QA system has about the evidence that the candidate answer is inferred by the input question, i.e., that the candidate answer is the correct answer for the input question.

The resulting confidence scores or measures are processed by a final confidence merging and ranking stage 370 which compares the confidence scores and measures, compare them against predetermined thresholds, or perform any other analysis on the confidence scores to determine which hypotheses/candidate answers are the most likely to be the answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question.

After stage 380, or as part of stage 380, the set of candidate answers is output via a graphical user interface, which provides the user with tools for collaborating with the QA system to review, evaluate, and modify the listing of candidate answers and the evidence associated with these candidate answers that is evaluated by the QA system. That is, at stage 390, the graphical user interface engine not only receives the final ranked listing of candidate answers generated by the QA system pipeline 300, but also receives the underlying evidence information for each of the candidate answers from the hypothesis and evidence scoring stage 350, and uses this information to generate a graphical user interface outputting the ranked listing of candidate answers and an output of the selected portions of the corpus of data/information that supports, and/or detracts, from the candidate answers being the correct answer for the input question, referred to hereafter as the "evidence passages." Stage 390 may also cache candidate answers and evidence in QA cache 395 to more quickly provide answers and supporting evidence for recently or frequently asked questions.

Figure 4:
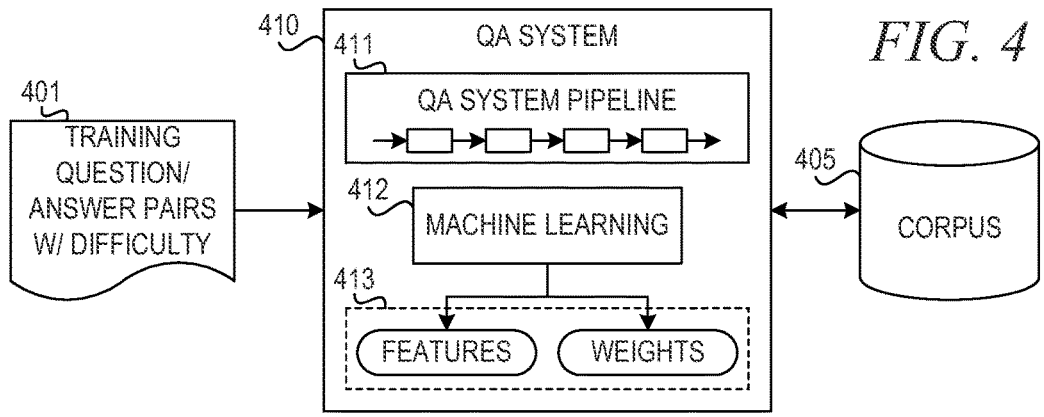
FIG. 4 is a block diagram illustrating training of a system for rating difficulty in accordance with an illustrative embodiment.

FIG. 4 is a block diagram illustrating training of a system for rating difficulty in accordance with an illustrative embodiment. In the depicted embodiment, QA system 410 receives a set of training question/answer pairs with predetermined difficulty scores 401. In an example embodiment, the question text includes multiple-choice answer selections. In one example embodiment, test training question/answer pairs 401 also includes the question type (e.g., essay, multiple-choice, short answer, etc.). In one example embodiment, an expert, teacher, professor, or other user provides the predetermined difficulty scores. In this example, the user providing the difficulty score is a person who has thorough knowledge of the subject matter and the source knowledge in corpus 405. In another example embodiment, students or other users of QA system 410 provide feedback that the system uses to derive the ultimate difficulty score. For example, many users may contribute feedback in the form of difficulty scores, which the system then uses to calculate the difficulty score using a mathematical operation. For instance, the system may simply take an average or median of the user-provided scores. In another example, the system may remove outliers before calculating the difficulty score for each question/answer pair.

QA system 410 generates candidate answers for the training questions 401 as described above with respect to FIGS. 1-3. QA system 410 uses QA system pipeline 411, which comprises a plurality of software engines, also referred to as annotation engines or annotators. Each of the annotation engines in QA system pipeline 411 performs a specialized function, such as parsing, counting, marking parts of speech, or more sophisticated natural language processing functions, such as identifying the topicality/centrality of a topic, identifying discourse structure attributes, etc. The annotation engines in QA system pipeline 411 produce output, referred to herein as "features," to be used by other annotation engines in the pipeline. These annotation engines process portions of the input question, portions of information in corpus 405, portions of the candidate answers, or features produced by previous annotation engines in the pipeline.

A challenge in computing question difficulty is that "difficulty" in a test question, for example, may arise from a variety of reasons. For example, the concept may be unimportant or simply not focused or repeated in the materials, and, therefore, may be less likely to be recalled by students who skimmed the materials. Only those who read the material carefully will recall the fact. As another example, the question may be poorly worded or vague; therefore, providing the desired answer may be problematic. In addition, the question may require the student to synthesize or integrate material or demonstrate mastery of the concept by applying the concept in a creative way, rather than simply recalling what was stated in the materials.

The illustrative embodiments recognize that question difficulty may arise from various sources and marks differing clues when comparing a question to the source pedagogical materials that the question covers. Thus, an illustrative embodiment supplements the annotation engines in QA system pipeline 411 to include annotation engines that produce features for generating a question difficulty score. As an example, one embodiment is to use inverse document frequency as a difficulty measure for factual questions. In domains dealing with factual questions, the difficulty of the question is inversely proportional to the probability that the average intended user of the question knows all facts present within the answer. Thus, the more frequently a fact that the question relies upon is mentioned in the corpus 405, the more likely the user will know the fact. Therefore, the difficulty of such a question is inversely proportional to the document frequency. Inverse Document Frequency (IDF), which is the inverse of Term Frequency (TF), is a useful measure of question difficulty. If a question contains more than one identifiable fact, the question difficulty is proportional to the "hardest" fact in the question and increases with the number of independent facts in the question.

In addition to corpus-internal measures, QA system pipeline 411 can be used to judge the difficulty of a question by passing the question as input to QA system 410 and evaluating the output list of ranked/scored candidate answers through a plurality of means. For example, if a large amount of supporting evidence is produced for the highest ranked candidate answer and there is a large gap between the confidence score of the highest ranked candidate answer and the second highest ranked candidate answer, then the question may be judged to be easy. However, if few candidate answers are found and the amount of supporting evidence does not greatly differentiate the top two or three candidate answers, then that question may be assessed as difficult.

Other measures of difficulty are possible and may include difficulty-related metadata associated with documents, natural language (NL), artificial intelligence (AI), machine learning techniques, etc. Examples of features relevant to question difficulty may include, without limitation:

a number of times the target concept is referenced in the text, either through a direct mention or via anaphoric mention;

features that indicate the topicality/centrality of the topic when it is mentioned, for example using syntactic clues such as whether the mention was in the subject position, intersentential discourse clues, such as the topical foci determined in the Centering Framework, or discourse structure attributes, such as whether the phrase containing the concept is a Nucleus or Satellite as defined in rhetorical structure theory;

tuple frequency: extracting the predicate/argument structure of the question as a semantic frame: the frequency of that semantic frame within the material;

position in the materials of the initial mention of the concept: beginning vs. end of material, a proxy for the complexity of the concept, assuming that foundational concepts are explained in the material early and more complex concepts that build on many others would be discussed later;

whether a definition of the target is contained within the material (the presence of a definition indicates that the concept is a focus of the material and also introduced within the material);

the Term Frequency (TF)/Inverse Document Frequency (IDF) score of the term within the materials, assuming the materials can be segmented into document boundaries; and, the degree to which the term is used in the sentence in an unexpected context, compared to its typical context within the document set, indicating if the target concept is being used in a way that requires the student to recognize a novel application of a familiar concept.

The above list of features is not intended to be limiting. Any combination of the above features, as well as other features that may be discovered through natural language processing, artificial intelligence, metadata, machine learning, etc., may contribute to generating a question difficulty score.

The illustrative embodiment depicted in FIG. 4 uses supervised machine learning to train the difficulty score calculation. For each question in test question/answer pairs 401, machine learning component 412 identifies the features generated by QA system pipeline 411 that are relevant to the question and/or contribute to the high confidence candidate answers that correspond to the known correct answer in the question/answer pair. Machine learning component 412 utilizes the identified set of features to learn a mapping between the question/answer material and the difficulty level. Machine learning component 412 assigns weights for the features to scale the question difficulty score. In one example embodiment, machine learning component 412 uses a linear regression model to calibrate the weights that scale to the provided difficulty score. The mapping of features and weights comprise machine learning model 413.

In an alternative embodiment, QA system 410 receives an initial set of parameters to generate a set of difficulty scores and allows users to provide feedback. Machine learning component 412 then derives the weights that scale to the difficulty scores generated in this manner.

In yet another example embodiment, machine learning component 412 uses a Bayesian classifier, entropy-based model, such as a decision tree or another appropriate technique known in the art.

In another example embodiment, machine learning component 412 executes within a separate data processing system from the QA system 410. For instance, QA system 410 and machine learning component 412 may execute within different servers, different physical machines, or different virtual machines. In one embodiment, machine learning component 412 executes on a client data processing system that has access to QA system 410 via an Application Programming Interface (API) or the like.

Figure 5:
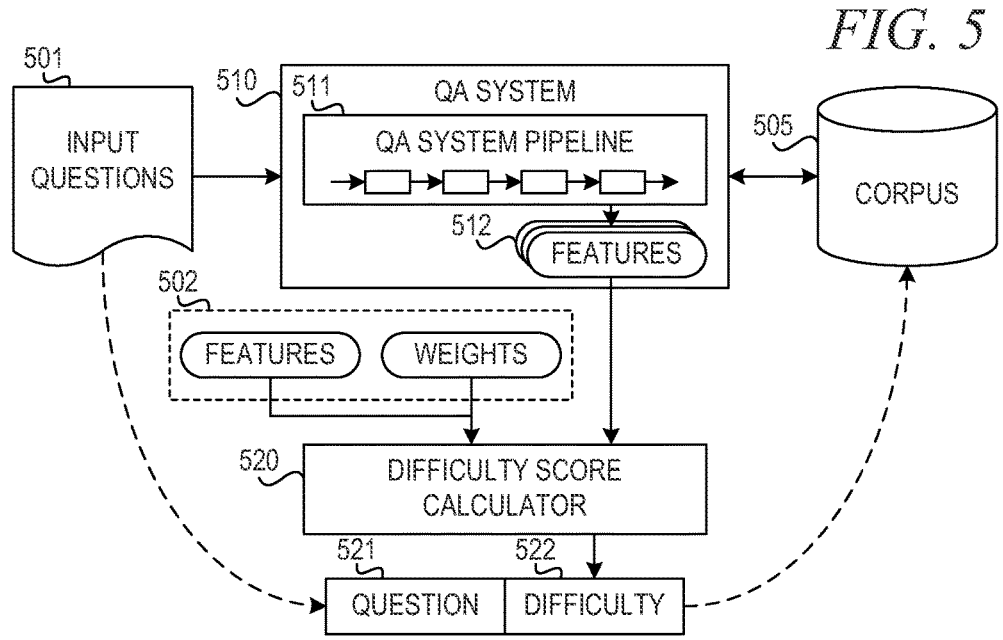
FIG. 5 is a block diagram illustrating a system for rating difficulty in accordance with an illustrative embodiment.

FIG. 5 is a block diagram illustrating a system for rating difficulty in accordance with an illustrative embodiment. QA system 510 receives input questions 501. In one embodiment, input questions 501 comprise a set of questions generated by a user or system, such as questions generated by a teacher, professor, or expert in the domain, a question paper generated by QA system 510 or another question generation system, questions from corpus 505, or questions mined from message boards, knowledge bases, online forums, Frequently Asked Questions (FAQ) documents, technical support communications, or the like.

QA system 510, using QA system pipeline 511, then generates candidate answers using corpus 505 as the knowledge source. QA system pipeline 511 generates features 512, including the features described above with respect to FIG. 4, in the process of generating the candidate answers.

Difficulty score calculator 520 receives features 512 and machine learning model 502. For each question 521 from input questions 501, difficulty score calculator 520 uses machine learning model 502 to generate a question difficulty score 522. That is, difficulty score calculator 520 applies weights from machine learning model 502 to features 512, as mapped in machine learning model 502. Thus, difficulty score calculator 520 calculates the difficulty score using the weights as coefficients to scale the difficulty score 522.

In one embodiment, QA system 510 or difficulty score calculator 520 stores question difficulty score 522 in association with question 521—as well as question type, question answer, and metadata in one example embodiment—in corpus 505 or another question storage (not shown). Thus, the stored questions in corpus 505 serves as a source of questions for future question sets.

In an example embodiment, a user provides feedback to correct the difficulty score 522. Difficulty score calculator 520 then adjusts difficulty score 522 based on user feedback, as well as the machine learning model 502. Thus, in this embodiment, difficulty score calculator 520 includes a machine learning component (not shown) to continuously adjust machine learning model 502 as more actual difficulty scores are collected through user feedback.

In one example embodiment, difficulty score calculator 520 is a component of QA system 510. However, in another example embodiment, difficulty score calculator 520 executes within a separate data processing system from the QA system 510. For instance, QA system 510 and difficulty score calculator 520 may execute within different servers, different physical machines, or different virtual machines. In one embodiment, difficulty score calculator 520 executes on a client data processing system that has access to QA system 510 via an Application Programming Interface (API) or the like.

Figure 6:
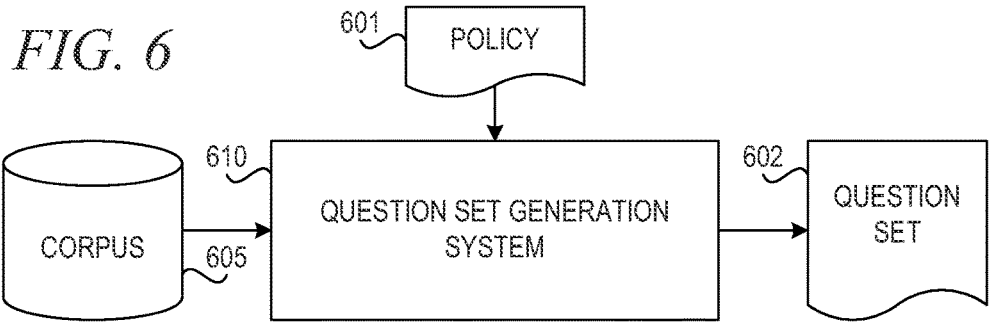
FIG. 6 is a block diagram of a system for selecting a question set in accordance with an illustrative embodiment.

FIG. 6 is a block diagram of a system for selecting a question set in accordance with an illustrative embodiment. Question set generation system 610 receives a policy 601 for generating a question set 602, which may be a test, quiz, or any other set of questions for a particular topic or source of information. In one embodiment, policy 601 is a target difficulty level. In this case, question set generation system 610 identifies questions in corpus 605 having a question difficulty score that is consistent with the difficulty level specified in policy 601.

In one example embodiment, policy 601 also stores a threshold. In this embodiment, question set generation system 610 identifies questions such that each question, or the entire set of questions, has a difficulty score within the threshold of the specified difficulty level.

In an alternative embodiment, question generation system 610 generates multiple sets of questions that have an overall difficulty level that is within a threshold of the difficulty level specified in policy 601. Therefore, in this embodiment, question set generation system 610 generates a plurality of unique question sets 602 that have an equivalent overall difficulty. This allows a plurality of students to each take a different test while ensuring all of the tests are equivalent in difficulty.

In other example embodiments, policy 601 may include other parameters not mentioned for selecting or disregarding questions from corpus 605. For example, policy 601 may include a number of questions for each topic to include in a question set. In another example, policy 601 includes a difficulty level for each topic. Policy 601 may also associate difficulty levels with corresponding domains or source materials. In yet another example embodiment, policy 601 associates different difficulty level for each respective subset of students, such as grade level, Advanced Placement (AP), etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 7 is a flowchart illustrating operation of training a system for rating difficulty in accordance with an illustrative embodiment. Operation begins (block 700), and the system receives a training set of question/answer pairs with difficulty scores (block 701). For each question/answer pair (block 702), the system generates one or more candidate answers for the question (block 703). The system extracts features of the question/answer pair (block 704) and assigns weights for the features to scale the difficulty score (block 705).

Then, the system determines whether the question/answer pair is the last question/answer pair (block 706). If the question/answer pair is not the last question/answer pair, operation returns to block 702 to consider the next question/answer pair. If the question/answer pair is the last question/answer pair in block 706, the system stores a mapping of features to the assigned weights in a machine learning model (block 707). Thereafter, operation ends (block 708).

Figure 8:
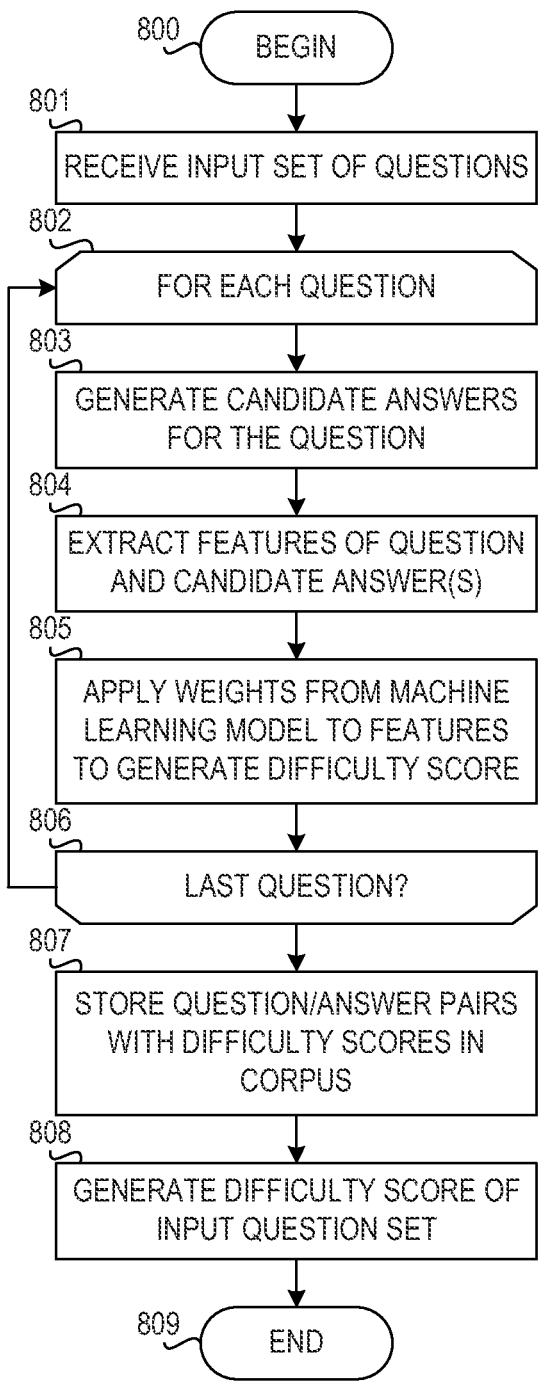
FIG. 8 is a flowchart illustrating operation of a system for rating difficulty in accordance with an illustrative embodiment.

FIG. 8 is a flowchart illustrating operation of a system for rating difficulty in accordance with an illustrative embodiment. Operation begins (block 800), and the system receives an input set of questions (block 801). For each question in the input set (block 802), the system generates one or more candidate answers for the question (block 803). The system extracts features of the question and the one or more candidate answers (block 804). The system then applies weights from the machine learning model to the extracted features to generate a question difficulty score (block 805).

Then, the system determines whether the question is the last question (block 806). If the question is not the last question in the input set, operation returns to block 802 to consider the next question. If the question is the last question in block 806, the system stores the question in association with the one or more candidate answers and the generated difficulty score in the corpus (block 807). In one example embodiment, the system generates a difficulty score for the input question set (block 808). Thereafter, operation ends (block 809).

FIG. 9 is a flowchart illustrating operation of a system for selecting a question set in accordance with an illustrative embodiment. Operation begins (block 900), and the system receives a question policy (block 901). In an example embodiment, the question policy includes a target difficulty level and a threshold. In other embodiments, the question policy may associate different difficulty levels with different domains, source materials, or subsets of test takers. The system generates a question set based on the question policy and a corpus of questions and source material (block 902). Thereafter, operation ends (block 903).

In one example embodiment, the system generates a single question set having an overall difficulty score that is within the threshold of the question difficulty level in the question policy. In another example embodiment, the system generates a question set wherein each question is within the threshold of the question difficulty level in the question policy. In another embodiment, the system generates a plurality of question sets having equivalent overall difficulty.

Thus, the illustrative embodiments provide a mechanism for rating difficulty of questions given a corpus of knowledge. The illustrative embodiments provide a training system for training a machine learning model to develop a mapping of features associated with questions and answers to weights for scaling the question difficulty score. The illustrative embodiments also provide a system for determining a question difficulty score for a given input question using the machine learning model and features extracted from the question and one or more candidate answers. Furthermore, the illustrative embodiments provide a system for generating question sets based on a question policy that indicates a target difficulty level and a threshold.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a computer readable storage medium having a computer readable program stored therein, wherein the computer readable program, when executed on a computing device, causes the computing device to:
   receive an input question;
   generate one or more candidate answers from a corpus of knowledge using a pipeline of software engines, wherein the pipeline of software engines generates a plurality of features extracted from the question, the one or more candidate answers, or the corpus of knowledge;
   generate a question difficulty score based on the plurality of features using a machine learning model, wherein the machine learning model maps features to assigned weights for scaling the difficulty score;
   store the question difficulty score in association with the input question to form a stored set of questions;
   receive a question policy, wherein the question, policy comprises a target difficulty level and a threshold; and
   select a set of questions from the stored set of questions, wherein the set of questions have a difficulty within the threshold of the target difficulty level.

2. The computer program product of claim 1, wherein the plurality of features comprise an inverse document frequency measure, wherein the inverse document frequency measure is an inverse of a term frequency measure, wherein the term frequency measure specifies a frequency that a fact or concept appears in the corpus of knowledge.

3. The computer program product of claim 1, wherein the plurality of features comprises one or more features from the set consisting of:
   a number of times a target concept is referenced in the corpus of knowledge;
   a feature indicating a topicality or centrality of a topic;
   syntactic clues;
   intersentential discourse clues;
   discourse structure attributes;
   a frequency of a predicate/argument structure in the corpus of knowledge;
   a position in the corpus of knowledge of an initial mention of a concept;
   whether a definition of a term is contained within the corpus of knowledge; or
   a degree to which a term is used in a sentence in an unexpected context compared to a typical context within the corpus of knowledge.

4. The computer program product of claim 1, wherein the computer readable program further causes the computing device to train the machine learning model using supervised machine learning, wherein training the machine learning model comprises:
   providing a set of training question/answer pairs with associated known difficulty scores;
   generating one or more candidate answers for each question in set of training question/answer pairs from the corpus of knowledge using the pipeline of software engines, wherein the pipeline of software engines generates a set of features extracted from the question, the one or more candidate answers, or the corpus of knowledge for each question; and
   assigning a weight for each feature in the set of features for each question to map the set of features to the assigned weights for scaling the difficulty score.

5. An apparatus comprising:
   a processor; and
   a memory coupled to the processor, wherein the memory comprises instructions which, when executed by the processor, cause the processor to:
   receive an input question;
   generate one or more candidate answers from a corpus of knowledge using a pipeline of software engines, wherein the pipeline of software engines generates a plurality of features extracted from the question, the one or more candidate answers, or the corpus of knowledge;
   generate a question difficulty score based on the plurality of features using a machine learning model, wherein the machine learning model maps features to assigned weights for scaling the difficulty score;
   store the question difficulty score in association with the input question to form a stored set of questions;
   receive a question policy, wherein the question policy comprises a target difficulty level and a threshold; and
   select a set of questions from the stored set of questions, wherein the set of questions have a difficulty score within the threshold of the target difficulty level.

6. The apparatus of claim 5, wherein the plurality of features comprise an inverse document frequency measure, wherein the inverse document frequency measure is an inverse of a term frequency measure, wherein the term frequency measure specifies a frequency that a fact or concept appears in the corpus of knowledge.

7. The apparatus of claim 5, wherein the plurality of features comprises one or more features from the set consisting of:
a number of times a target concept is referenced in the corpus of knowledge;
a feature indicating a topicality or centrality of a topic;
syntactic clues;
intersentential discourse clues;
discourse structure attributes;
a frequency of a predicate/argument structure in the corpus of knowledge;
a position in the corpus of knowledge of an initial mention of a concept;
whether a definition of a term is contained within the corpus of knowledge;
a degree to which a term is used in a sentence in an unexpected context compared to a typical context within the corpus of knowledge.

8. The apparatus of claim 5, wherein the instructions further cause the processor to train the machine learning model using supervised machine learning, wherein training the machine learning model comprises:
providing a set of training question/answer pairs with associated known difficulty scores;
generating one or more candidate answers for each question in set of training question/answer pairs from the corpus of knowledge using the pipeline of software engines, wherein the pipeline of software engines generates a set of features extracted from the question, the one or more candidate answers, or the corpus of knowledge for each question; and
assigning a weight for each feature in the set of features for each question to map the set of features to the assigned weights for scaling the difficulty score.

9. The computer program product of claim 1, wherein generating the one or more candidate answers comprises submitting the input question to a question answering system, wherein the question answering system comprises the pipeline of software engines.

10. The computer program product of claim 9, wherein the pipeline of software engines comprises one or more annotation engines that contribute to generation of the one or more candidate answers.

11. The computer program product of claim 1, further comprising training the machine learning model using supervised machine learning.

12. The computer program product of claim 11, wherein the question policy comprises a target difficulty level and a threshold.

13. The apparatus of claim 5, wherein generating the one or more candidate answers comprises submitting the input question to a question answering system, wherein the question answering system comprises the pipeline of software engines.

14. The apparatus of claim 13, wherein the pipeline of software engines comprises one or more annotation engines that contribute to generation of the one or more candidate answers.

15. The apparatus of claim 5, further comprising training the machine learning model using supervised machine learning.

16. The apparatus of claim 15, wherein the question policy comprises a target difficulty level and a threshold.

* * * * *